(12) United States Patent
Zhu et al.

(10) Patent No.: US 9,404,533 B2
(45) Date of Patent: Aug. 2, 2016

(54) METHOD FOR CONTROLLING A GAS COMPRESSOR HAVING A MAGNETIC BEARING

(71) Applicant: Solar Turbines Incorporated, San Diego, CA (US)

(72) Inventors: Lei Zhu, San Diego, CA (US); Roman Braunstein, San Diego, CA (US); David B. Jahnz, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 697 days.

(21) Appl. No.: 13/857,650

(22) Filed: Apr. 5, 2013

(65) Prior Publication Data

US 2014/0303780 A1 Oct. 9, 2014

(51) Int. Cl.
| | |
|---|---|
| *G05B 15/02* | (2006.01) |
| *F16C 32/04* | (2006.01) |
| *F25B 49/02* | (2006.01) |
| *F04D 29/058* | (2006.01) |
| *H02K 7/09* | (2006.01) |

(52) U.S. Cl.
CPC .......... *F16C 32/0455* (2013.01); *F04D 29/058* (2013.01); *F25B 49/022* (2013.01); *G05B 15/02* (2013.01); *H02K 7/09* (2013.01); *F25B 2600/02* (2013.01)

(58) Field of Classification Search
None
See application file for complete search history.

(56) References Cited

U.S. PATENT DOCUMENTS

| | | | |
|---|---|---|---|
| 5,924,847 A | 7/1999 | Scaringe et al. | |
| 6,640,308 B1 * | 10/2003 | Keyghobad | G05B 19/042 370/254 |
| 6,994,158 B2 * | 2/2006 | Beitelmal | F25B 5/04 165/205 |
| 7,501,782 B2 | 3/2009 | Buhler et al. | |
| 7,723,883 B2 * | 5/2010 | Ozaki | F01D 15/005 310/90.5 |
| 2007/0246002 A1 * | 10/2007 | Taniguchi | F04D 25/0606 123/246 |
| 2009/0009017 A1 * | 1/2009 | Miyagawa | F04D 29/051 310/90.5 |
| 2014/0226459 A1 * | 8/2014 | Edmiston | H04J 3/0641 370/216 |

\* cited by examiner

*Primary Examiner* — Sean Shechtman
(74) *Attorney, Agent, or Firm* — Procopio, Cory, Hargreaves & Savitch LLP (57) ABSTRACT

A method for controlling a gas compressor having a magnetic bearing. The method includes communicating digital feedback data from a magnetic bearing system to a computer via a communication link, processing the feedback data with the computer and issuing a bearing control command in response to the feedback data, communicating the bearing control command from the computer to the magnetic bearing system via a communication link, providing operational processing and control of the gas compressor with the computer, and providing operational processing and control of the compressor driver with the computer.

18 Claims, 3 Drawing Sheets

METHOD FOR CONTROLLING A GAS COMPRESSOR HAVING A MAGNETIC BEARING

TECHNICAL FIELD

The present disclosure generally pertains to centrifugal gas compressors, and is more particularly directed toward a control system for a magnetic bearing within a centrifugal gas compressor.

BACKGROUND

Magnetic bearings are bearings that using magnetic levitation to support a load. Magnetic bearings may support moving machinery without physical contact. For example, they can levitate a rotating shaft, providing for rotation with very low friction and no mechanical wear. Active magnetic bearings use electromagnetic suspension, and may include an electromagnet assembly, power amplifiers configured to drive the electromagnets, a controller, and sensors (e.g., gap sensors) with associated electronics. The power amplifiers drive electromagnets on opposing sides of the shaft. The sensors provide feedback to control the position of the rotor within the gap. The controller offsets the current to drive the electromagnets as the rotor deviates from its desired position.

U.S. Pat. No. 5,924,847 issued to Scaringe et al. on Jul. 20, 1999 shows a magnetic bearing centrifugal refrigeration compressor and refrigerant having minimum specific enthalpy rise. In particular, the disclosure of Scaringe et al. is directed toward a vapor compression refrigeration system, such as a water chiller, using a centrifugal compressor with magnetic bearings and a refrigerant, specifically HFC-227ea and HFC-227ca. Magnetic bearings eliminate the problem caused by lubricated bearings to support rotating structure during normal compressor operation.

The present disclosure is directed toward overcoming known problems and/or problems discovered by the inventors.

SUMMARY OF THE DISCLOSURE

A method for controlling a gas compressor is disclosed herein. The method includes communicating digital feedback data from a magnetic bearing system to a computer via a communication link, processing the feedback data with the computer and issuing a bearing control command in response to the feedback data, communicating the bearing control command from the computer to the magnetic bearing system via a communication link, providing operational processing and control of the gas compressor with the computer, and providing operational processing and control of the compressor driver with the computer.

According to one embodiment, a control system for a centrifugal gas compressor is also disclosed herein. The control system includes a bearing input/output terminal including an input/output device, the input/output device configured to receive signals from at least one sensor of the magnetic bearing system, and to transmit control commands to at least one magnetic bearing driver of the magnetic bearing system. The control system further includes a computer having a bearing control module configured to issue control commands for the at least one magnetic bearing driver in response to the signals from the at least one sensor of the magnetic bearing system, a compressor control module configured to provide operational processing and control of the gas compressor, a driver control module configured to provide operational processing and control of the compressor driver, and a communication module configured to communicate with the bearing input/output terminal, the compressor driver, and the flow metering device. The control system further includes a first communication link between the computer and the bearing input/output terminal, a second communication link between the computer and the compressor driver and a third communication link between the computer and the flow metering device.

DETAILED DESCRIPTION

The present disclosure relates to the control of a gas compressor having a magnetic bearing system. In particular, present disclosure relates to a control system and method of control where a computer, such as an industrial personal computer (PC), is configured to control the operation of a magnetic bearing system as well as other systems of the gas compressor. Here, signal communications are digitized proximate the gas compressor and communicated using data packet communications amenable to providing a separate input frame and a separate output frame, instead of the standard frame containing both inputs and outputs. The present disclosure provides a system to increase control speed and enable a PC to be used to control a magnetic bearing. Once the PC control is possible, the compressor and magnetic bearing controls could be done on the same PC and the systems could be designed so the compressor, magnetic bearings, and engine or motor all share the same electric power supply and uninterrupted power source (UPS).

Figure 1:
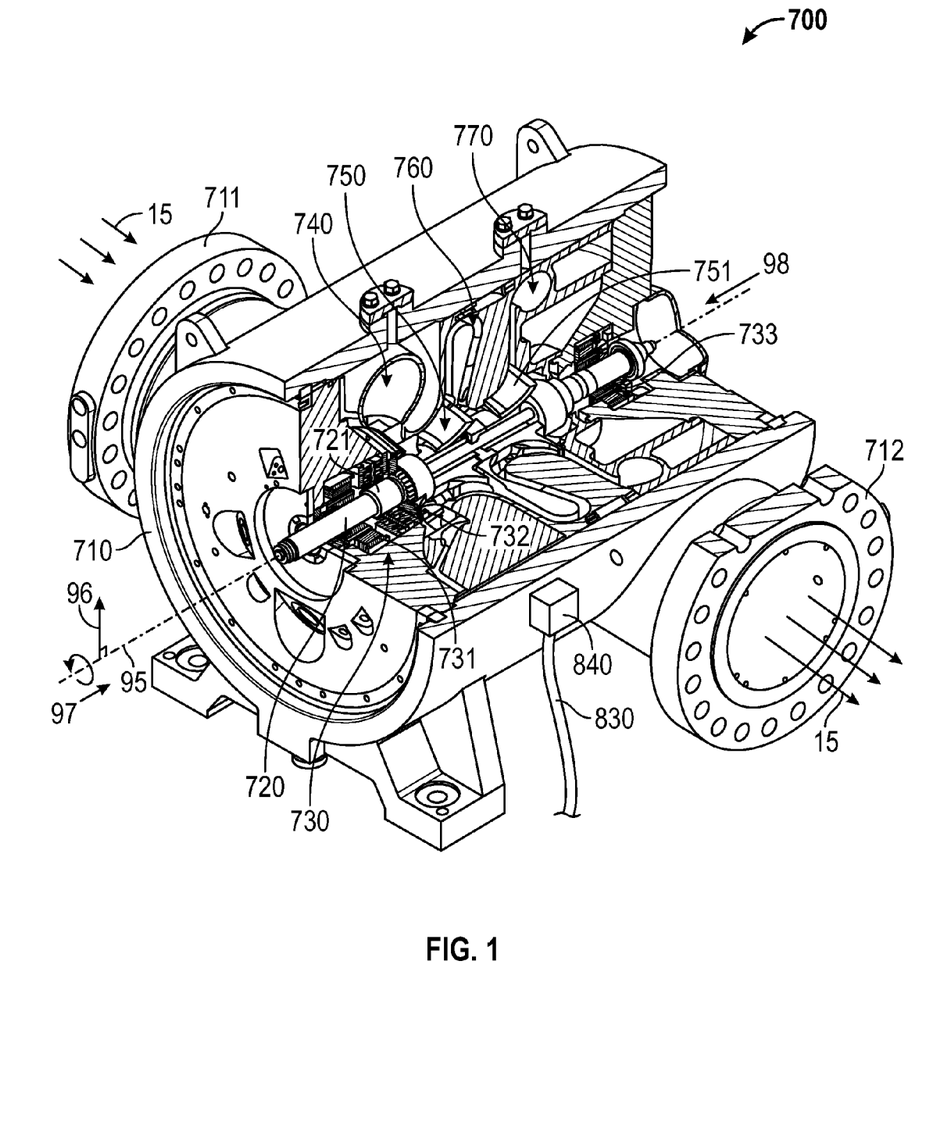
FIG. 1 is a cutaway illustration of an exemplary centrifugal gas compressor.

FIG. 1 is a cutaway illustration of an exemplary centrifugal gas compressor 700. Some of the surfaces have been left out or exaggerated (here and in other figures) for clarity and ease of explanation. In addition the centrifugal gas compressor 700 is shown in isolation from its driver and flow path.

This disclosure may generally reference a center axis 95 of rotation of the centrifugal gas compressor, which may be generally defined by the longitudinal axis of its compressor shaft 720. The center axis 95 may be common to or shared with various other concentric components of the centrifugal gas compressor. All references to radial, axial, and circumferential directions and measures refer to center axis 95, unless specified otherwise, and terms such as "inner" and "outer" generally indicate a lesser or greater radial distance from the center axis 95, wherein a radial 96 may be in any direction perpendicular and radiating outward from center axis 95.

In addition, this disclosure may reference a forward and an aft direction. Generally, all references to "forward" and "aft" are associated with the flow direction, relative to the center axis 95, of the compressed gas. In particular, the suction end 97 of the centrifugal gas compressor is referred to as the forward end or direction, and the discharge end 98 is referred to as the aft end or direction, unless specified otherwise.

The centrifugal gas compressor 700 includes a compressor housing 710, a suction port 711, discharge port 712, a compressor shaft 720, a compressor bearing system 730, a inlet 740, a rotor 750, a diffuser 760, and a collector 770. The rotor 750 may include one or more centrifugal impellers 751. The compressor shaft 720 may also include a suction end and a discharge end associated with the suction end 97 and the discharge end 98 of the centrifugal gas compressor 700. The compressor shaft 720 may be a single shaft or dual shaft configuration. In a dual shaft configuration, compressor shaft 720 may include a suction end stubshaft and a discharge end stubshaft.

The compressor shaft 720 and attached elements are supported by the compressor bearing system 730. The compressor bearing system 730 may include a suction end radial bearing 731, a discharge end radial bearing 732, and a thrust bearing 733. Suction end radial bearing 731 and discharge end radial bearing 732 support axial ends of the compressor shaft 720. The thrust bearing 733 counteracts axial forces applied to the compressor shaft 720.

In the embodiment shown, the suction end radial bearing 731, the discharge end radial bearing 732, and the thrust bearing 733 are magnetic bearing assemblies. In particular, the magnetic bearing assemblies are configured to magnetically levitate the compressor shaft 720 and/or a thrust collar 721 within a gap therebetween, with very low friction and no mechanical wear. Additionally, the compressor bearing system 730 may also include auxiliary or backup bearings.

During normal operation, the process gas 15 enters the centrifugal gas compressor 700 at the suction port 711 and is routed to the compressor inlet 740. The process gas 15 is compressed by one or more centrifugal impellers 751 mounted to the compressor shaft 720, diffused by one or more diffusers 760, and collected by the collector 770. The compressed process gas 15 exits the centrifugal gas compressor 700 at a discharge port 712.

According to one embodiment, the process gas 15 may be controlled at or proximate the centrifugal gas compressor 700. In particular, one or more flow control devices may be integrated into the centrifugal gas compressor 700 as part of a compressor monitoring system. In addition, one or more flow control devices may be part of a process control system separate from the centrifugal gas compressor 700.

Moreover, the process gas 15 may be controlled and/or metered coming into or leaving the centrifugal gas compressor 700. This may include controlling gas flow, gas pressure, gas temperature, inlet pressure, outlet pressure, etc. For example, the centrifugal gas compressor 700 may be controlled with one or more valves (e.g., yard valves), or other flow metering devices, located proximate the suction port 711 and/or the discharge port 712. Also for example, the centrifugal gas compressor 700 may be controlled using one or more pressure regulators configured to regulate pressure of the process gas 15. Also for example, the centrifugal gas compressor 700 may be controlled with one or more temperature regulators (e.g., heat exchangers) configured to regulate the temperature of the process gas 15.

Figure 2:
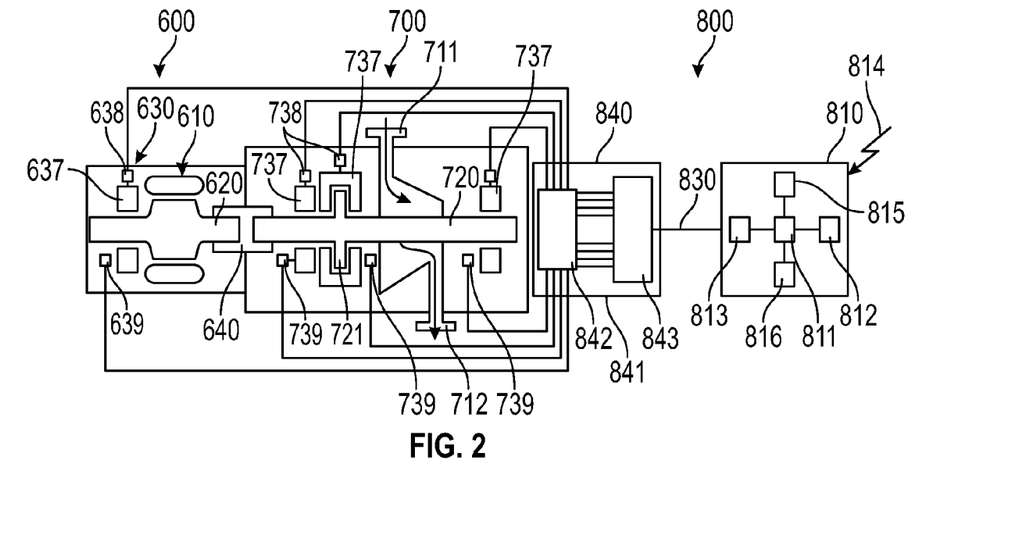
FIG. 2 is a block diagram of an exemplary system for controlling magnetic bearings in the centrifugal gas compressor of FIG. 1.

FIG. 2 is a block diagram of an exemplary system for controlling magnetic bearings in the centrifugal gas compressor 700 of FIG. 1. In particular, the control system 800 is shown along with the centrifugal gas compressor 700 and with a compressor driver 600. The control system 800 is configured for magnetic bearing control, but, as discussed below, may be configured for additional control functions. For clarity, single elements may be represented where multiple elements may be, and are used.

Regarding the centrifugal gas compressor 700, the magnetic bearing assemblies in the centrifugal gas compressor 700 may each include an electromagnet assembly 737, a magnetic bearing driver (e.g., a set of power amplifiers 738 configured to supply current to the electromagnets), and one or more sensors 739—with associated electronics to provide the feedback required to control the position of the levitated member (e.g., the compressor shaft 720 and/or the thrust collar 721) within the gap. One or more of the electromagnet assembly 737, the power amplifier 738, and the sensor 739 may be combined into a single device or shared with another device.

Regarding the compressor driver 600, the compressor driver 600 may be any device configured to drive the centrifugal gas compressor 700. In particular, the compressor driver 600 may be mechanically coupled to the compressor shaft 720 of centrifugal gas compressor 700, and configured to transmit a driving torque. For example, the compressor driver 600 may be an electric motor, a gas turbine engine, a reciprocating engine, etc.

Moreover, the compressor driver 600 and the centrifugal gas compressor 700 may have any convenient configuration. For example, the compressor driver 600 and the centrifugal gas compressor 700 may have individual housings, a common housing, or a joined or partially shared housing. Similarly, the compressor driver 600 and the centrifugal gas compressor 700 may have separate joined drive shafts, a single or common shaft, or a combination thereof. Moreover, the compressor driver 600 and the centrifugal gas compressor 700 may have no shaft or only a partial shaft. For example, the one or more centrifugal impellers 751 (FIG. 1) may be stacked together such that no shaft is needed therebetween.

As illustrated, the compressor driver 600 may include a driver motor 610, a driver shaft 620, a driver bearing system 630, and a power output coupling 640. Here, the driver motor 610 is embodied as an electric motor configured to apply torque to the driver shaft 620. The driver shaft 620 is mechanically coupled to the compressor shaft 720 of the centrifugal gas compressor 700 via the power output coupling 640. The driver shaft 620 may be entirely supported by the driver bearing system 630. Alternately, and as illustrated, the driver shaft 620 may be partially supported by the driver bearing system 630. In this configuration, the driver shaft 620 may then also be supported by the compressor bearing system 730 of the centrifugal gas compressor 700 via the power output coupling 640.

According to one embodiment, the driver bearing system 630 may include one or more magnetic bearing assemblies. As in the centrifugal gas compressor 700, the one or more magnetic bearing assemblies are configured to levitate the driver shaft 620 and/or a thrust collar within a gap therebetween. Likewise, the magnetic bearing assemblies in the compressor driver 600 may each include an electromagnet assembly 637, a magnetic bearing driver (e.g., a set of power amplifiers 638 configured to supply current to the electromagnets), and one or more sensors 639, one or more of which may be combined into a single device or shared with another device. Additionally, the driver bearing system 630 may also include auxiliary or backup bearings.

According to one embodiment, the magnetic bearing assemblies in the compressor driver 600 and the centrifugal gas compressor 700 may be controlled together. In particular, the control system 800 may be communicably coupled and configured to control one or more magnetic bearings of compressor bearing system 730, the driver bearing system 630, or any combination thereof. Moreover, the control system 800 may be configured to control both the driver bearing system 630 and the compressor bearing system 730 as a single magnetic bearing system. For example, the control system 800 may be configured to receive feedback from the sensors 639, 739 in both the driver bearing system 630 and the compressor bearing system 730, respectively. The control system 800 may be further configured to process the feedback together, and then issue control commands to the power amplifiers 638, 738, in both the driver bearing system 630 and the compressor bearing system 730, respectively.

The control system 800 may include a computer 810, a communication link 830, and a bearing input/output ("I/O") terminal 840. In particular, the computer 810 is communicably coupled to the bearing I/O terminal 840 via the communication link 830. The bearing I/O terminal 840 is then communicably coupled to each magnetic bearing system to be controlled. In addition, the control system 800 may be dedicated to control of the magnetic bearing systems, or may also control other components and systems, as discussed below.

The computer 810 may be any personal computer having real time control capability. In particular, the computer can include a processor 811, a memory 812, a communication device 813, a power supply 814, a user output 815 (e.g., a display), and a user input 816 (e.g., a keyboard). According to one embodiment, the computer 810 may be an industrial PC. For example, the computer 810 may be rack mountable (e.g., 19-inch (48.26 cm) or 23-inch (58.42 cm)) and in conformance with one or more industrial PC standards (e.g., EIA/ECA-310-E). Also for example, the computer 810 may be a ruggedized INTEL processor-based industrial PC. In addition, the computer 810 may be configured as a front-end to another control computer in a distributed processing environment. In addition, the computer 810 may be dedicated for control of the compressor bearing system 730 and/or the driver bearing system 630 ("the magnetic bearing system"), or shared with one or more additional control functions.

The processor 811 may include a general purpose processor or any processor capable of receiving data from the sensors, determining whether and what adjustment should be made to the magnetic bearing system, and communicating any desired commands. A general-purpose processor can be a microprocessor, but in the alternative, the processor can be any processor, controller, microprocessor, or microcontroller. A processor can also be implemented as a combination of computing devices, for example, a combination of a digital signal processor (DSP) and a microprocessor, a plurality of microprocessors, one or more microprocessors in conjunction with a DSP core, or any other such configuration.

The processor 811 may be configured to receive data from the magnetic bearing system. In particular, the processor 811 may be communicably coupled to one or more sensors 639, 739 of the magnetic bearing system via the communication link 830. Likewise, the processor 811 may be configured to issue commands to one or more components of magnetic bearing system. In particular, the processor 811 may be communicably coupled to one or more power amplifiers 638, 738 of the magnetic bearing system via the communication link 830.

The memory 812 may include RAM memory, flash memory, ROM memory, EPROM memory, EEPROM memory, registers, hard disk, a removable disk, a CD-ROM, video tape and/or any other form of machine or computer readable storage medium. According to one embodiment, the memory 812 may have a volatile memory storage capacity greater that 2 GB.

The processor 811 and the memory 812 are configured to work together to implement the functionality of the control system 800. In particular, the memory 812 can be coupled to the processor 811 such that the processor 811 can read information from, and write information to the storage medium. According to one embodiment, memory 812 is configured to record instructions for one or more modules of the control system 800.

The communication device 813 may include any piece of equipment, hardware, or software configured to move data to and from the computer 810. In particular, the communication device 813 is configured to transmit control commands from the processor 811 to the bearing I/O terminal 840 via the communication link 830. Also, the communication device 813 is configured to receive digital feedback signals from the bearing I/O terminal 840 via the communication link 830.

According to one embodiment, the communication device 813 may be configured for data packet communications across a communication network. In particular, the communication device 813 may be configured to communicate control commands and feedback data in accordance with a standardized fieldbus communication protocol. For example, the communication device 813 may be configured to communicate data across an Ethernet based communication network using standard IEEE 802.3 Ethernet frames. Also for example, the communication device 813 may be configured to communicate EtherCAT (Ethernet for Control Automation Technology) communications with the bearing I/O terminal 840. Furthermore, the communication device 813 and any associated hardware or software may be configured to operate as an EtherCAT master controller.

The communication device 813 may be embodied as a dedicated device, such as a network interface card, or may have shared or distributed functionality with other components of the computer 810. The communication device 813 may be configured for wired, wireless, and/or optical communications. Furthermore, the communication device 813 may be configured for full-duplex and/or half-duplex communications across one or more communication links 830.

The power supply 814 may include any hardware configured to supply power to the computer. In particular, the power supply 814 is configured to provide uninterrupted power during bearing operation. According to one embodiment, the power supply 814 may be configured to receive power from an uninterrupted power source (e.g., facility power) shared with one or more of the compressor driver 600, the centrifugal gas compressor 700, the electromagnet assemblies 637, 737, etc.

The communication link 830 may be any convenient link, including a wired, wireless, and/or optical link. The communication link 830 is configured to support digital communications between the computer 810 and bearing I/O terminal 840. For example, the communication link 830 may be use twisted-pair cables for the physical layer of an Ethernet computer network, or any other Ethernet compliant cable.

In addition, the communication link 830 may provide for the computer 810 to be located at a remote location as opposed to a DSP controller proximate or collocated with magnetic bearing assemblies. In particular, the communication link 830 may extend ten or more feet (>3 meters) between the bearing I/O terminal 840 and the computer 810. For example, the computer 810 may be located at user-friendly location, such as in a control room, while the communication link 830 extends back to the bearing I/O terminal 840. The bearing I/O terminal being in much closer proximity to the centrifugal gas compressor 700. This may be beneficial in that operators may have greater access to the controller in general and/or may access the controller without being exposed to the working machinery. In addition, greater resources may be available in the remote location, such as processors, communication networks, climate control, etc.

The bearing I/O terminal 840 may include a housing 841, an I/O device 842, and a communication device 843. The housing 841 may enclose the I/O device 842 and the communication device 843, which may be coupled to each other therein. In addition, the I/O device 842 and the communication device 843 may be embodied as two units, as a single unit, or have a distributed and/or shared architecture. According to one embodiment, the bearing I/O terminal 840 may be configured to receive power from or be powered by an uninterrupted power source. Moreover, the uninterrupted power source may be common or shared with the computer 810.

The bearing I/O terminal 840 may be fixed to, within or located proximate the centrifugal gas compressor 700 (such as in a control cabinet of the centrifugal gas compressor 700). Where the housing 841 is located in or on the centrifugal gas compressor 700, it may be sealed or otherwise include additional environmental protections.

In general, the bearing I/O terminal 840 is configured as a communication conduit between the computer 810 and the magnetic bearing system. In particular, the bearing I/O terminal 840 may be communicably coupled to one or more components/systems of the magnetic bearing system via the I/O device 842. For example the I/O device 842 may be wired to the electromagnet assemblies 637, 737, the power amplifiers 638, 738, and the sensors 639, 739.

The I/O device 842 may be configured to receive signals from at least one sensor 639, 739 of the magnetic bearing system, and further configured to transmit control commands to at least one power amplifier 638, 738 of the magnetic bearing system. In particular, the I/O device 842 may include any convenient device of any architecture/distribution that is configured to perform analog-to-digital (A/D) conversion, digital-to-analog (D/A) conversion, signal sampling, electronic filtering and/or other signal conditioning. For example, the I/O device 842 may include an A/D converter configured to digitize signals from the at least one sensor 639, 739 of the magnetic bearing system or other devices of the compressor driver 600 and/or the centrifugal gas compressor 700. Similarly, the input/output device 842 may include a D/A converter configured to convert control commands to analog signals for the power amplifiers 638, 738 of the magnetic bearing system. Also for example, the bearing I/O terminal 840 may be embodied as an ASIC interfaced with the sensors 639, 739, power amplifiers 638, 738 and/or other devices.

The communication device 843 may include any piece of equipment, hardware, or software configured to move data to and from the bearing I/O terminal 840. In particular, the communication device 843 is configured to transmit digital feedback signals from the I/O device 842 to the computer 810 via the communication link 830. Also, the communication device 843 is configured to receive control commands from the computer 810 via the communication link 830. According to one embodiment, the communication device 813 of the computer 810 and the communication device 843 of the bearing I/O terminal 840 are configured to communicate with an input/output delay of less than 60 microseconds.

Like the communication device 813 of the computer 810, the communication device 843 of the bearing I/O terminal 840 may be configured for data packet communications across a communication network. In particular, the communication device 843 may be configured to communicate control commands and feedback data in accordance with a standardized fieldbus communication protocol. For example, the communication device 843 may be configured to communicate data across an Ethernet based communication network using standard IEEE 802.3 Ethernet frames. Also for example, the communication device 843 may be configured to communicate EtherCAT (Ethernet for Control Automation Technology) communications with the computer 810. Unlike the communication device 813 of the computer 810, however, the communication device 843 may be configured as an EtherCAT slave controller communicably coupled to devices such as sensors 639, 739 and power amplifiers 638, 738 via the I/O device 842.

The communication device 843 of the bearing I/O terminal 840 may be embodied as a dedicated device, such as ASIC, or may have shared or distributed functionality with other components of the bearing I/O terminal 840. The communication device 843 may be configured for wired, wireless, and/or optical communications. Furthermore, the communication device 843 may be configured for full-duplex and/or half-duplex communications across one or more communication links 830.

According to one embodiment, communication device 843 may be configured to selectively communicate data. In particular, the communication device 843 may be configured to communicate different classes of data separately. For example, classes of data may be distinguished by data source (e.g., control commands from the computer 810 versus feedback data from sensors 639, 739). Also for example, multiple classes of data may used. According to one embodiment, a distinct data classes may provided for: feedback from radial bearings, control commands to radial bearings, feedback from thrust bearings, control commands to thrust bearings, environmental data, and data associated with other devices or systems (discussed below).

In selectively communicating data, the communication device 843 may be configured to selectively communicate data within data packets at separate times. In particular, the communication device 843 may communicate a first data packet for a first class of data and second data packet for a second class of data. For example, the communication device 843 may be configured to communicate a first data packet for feedback signals and second data packet for control commands. Also for example, in the EtherCAT configuration, the EtherCAT telegram may only include updates to Datagrams from a first class of signal (e.g., feedback signals) or to Datagrams from a second class of signal (e.g., control commands) but not to both at the same time. Thus, the communication device 843 is configured to selectively communicate a first and a second EtherCAT telegram with either a first set of Datagrams based on a first class of signal or with a second set of Datagrams based on a second class of signal, respectively.

According to one embodiment the EtherCAT telegram may be reduced in size to reflect only one class of data traveling at a time. In particular, the communication device 843 may be configured to alternate signal classes in one or more shared Datagrams.

Figure 3:
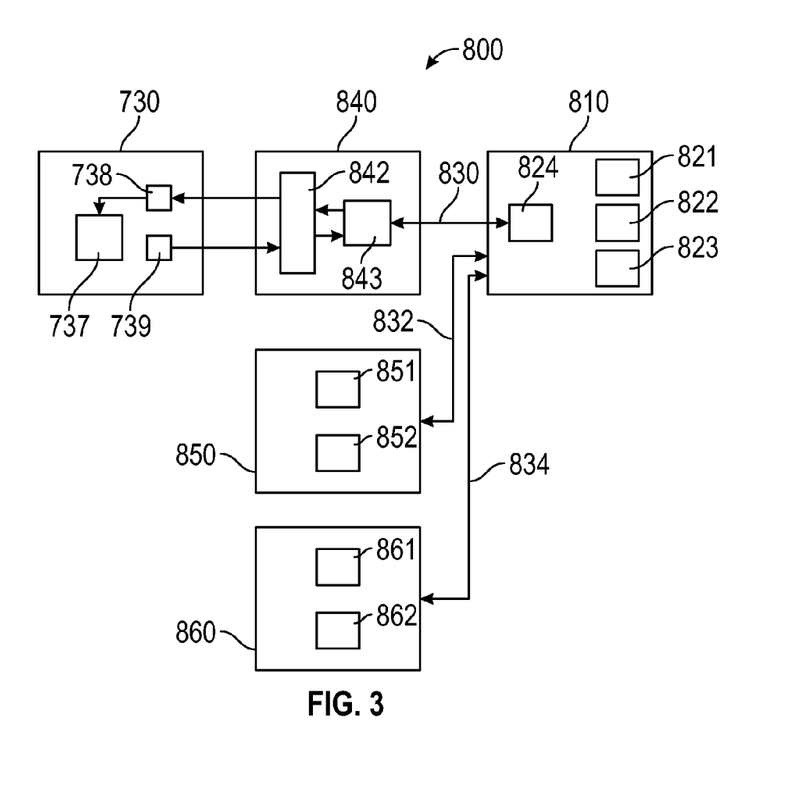
FIG. 3 is a functional block diagram of an exemplary system for controlling the centrifugal gas compressor of FIG. 1.

FIG. 3 is a functional block diagram of an exemplary system for controlling the centrifugal gas compressor of FIG. 1. In particular, the control system 800 for the magnetic bearing system is shown configured to also include control functionality for the centrifugal gas compressor 700 and the compressor driver 600. While the control system 800 may control both the driver bearing system 630 and the compressor bearing system 730 together, for convenience only the compressor bearing system 730 is illustrated.

The control system 800 includes the computer 810, the communication link 830, and the bearing I/O terminal 840 described above. In addition, the control system 800 may include a compressor I/O terminal 850 and a driver I/O terminal 860. The compressor I/O terminal 850 and a driver I/O terminal 860 are communicably coupled to the computer 810 via a compressor communication link 832 and a driver communication link 834. The compressor communication link 832 and/or the driver communication link 834 may be separate from, or integrated with each other. Furthermore, the compressor communication link 832 and/or the driver communication link 834 may be separate from or integrated with the communication link 830 to the bearing I/O terminal 840.

The compressor I/O terminal 850 is also communicably coupled to the centrifugal gas compressor 700. The compressor I/O terminal 850 may be fixed to, located within, or located proximate the centrifugal gas compressor 700 (such as in a control cabinet of the centrifugal gas compressor 700). Where the compressor I/O terminal 850 is located in or on the centrifugal gas compressor 700, it may be sealed or otherwise include additional environmental protections.

The driver I/O terminal 860 is also communicably coupled to the compressor driver 600. The driver I/O terminal 860 may be fixed to, located within, or located proximate the compressor driver 600 (such as in a control cabinet of the compressor driver 600 and or/the centrifugal gas compressor 700). Where the driver I/O terminal 860 is located in or on the compressor driver 600, it may be sealed or otherwise include additional environmental protections.

The compressor I/O terminal 850 may include a compressor I/O module 851 and a compressor communication module 852. The compressor I/O module 851 and the compressor communication module 852 are communicably coupled to each other, and are configured as a communication conduit between the computer 810 and the centrifugal gas compressor 700. In particular, the compressor I/O module 851 is communicably coupled to one or more components/systems of the centrifugal gas compressor 700 and the compressor communication module 852 is communicably coupled to the computer 810. In addition, the compressor I/O module 851 and the compressor communication module 852 may be embodied as two units, as a single unit, or have a distributed and/or shared architecture.

According to one embodiment, the compressor I/O module 851 may be configured to communicate signals with one or more compressor sensors (e.g., measuring valve position, inlet/outlet pressure, gas flow rate, temperature, heat exchanger status, etc.). Also for example, the compressor I/O module 851 may be configured to communicate commands to one or more flow control devices (described above), or other devices configured to control flow to and/or from the centrifugal gas compressor 700. In addition, the flow control device may include sensors configured to provide feedback regarding the flow metering device (e.g., inlet/outlet pressure, flow rate, temperature, etc.) to the compressor I/O module 851. The compressor I/O module 851 and the compressor communication module 852 may be embodied as an ASIC, interfaced with one or more sensors, flow metering device and/or other devices.

The driver I/O terminal 860 includes a driver I/O module 861 and a driver communication module 862. The driver I/O module 861 and the driver communication module 862 are communicably coupled to each other, and are configured as a communication conduit between the computer 810 and the compressor driver 600. In particular, the driver I/O module 861 is communicably coupled to one or more components/systems of the compressor driver 600 and the driver communication module 862 is communicably coupled to the computer 810. In addition, the driver I/O module 861 and the driver communication module 862 may be embodied as two units, as a single unit, or have a distributed and/or shared architecture.

According to one embodiment, the driver I/O module 861 may be configured to communicate signals with one or more driver sensors (e.g., measuring power, power bus voltage, power bus current, temperature, torque, rotational speed, etc.). Also for example, the driver I/O module 861 may be configured to communicate commands to a local controller such as a variable-frequency drive (VFD) (not shown), or other devices configured to provide power management and control for the compressor driver 600. Accordingly, driver I/O module 861 may be configured to operate the local controller rather than the compressor driver 600 directly. The driver I/O module 861 and the driver communication module 862 may be embodied may be embodied as an ASIC, interfaced with one or more sensors, a local controller of the compressor driver 600, and/or with other devices.

Returning to the computer 810 described above, the computer 810 may further include one or more functional modules configured to control all or part of the centrifugal gas compressor 700 and its compressor driver 600. In particular, the computer 810 may include a bearing control module 821, a compressor control module 822, a driver control module 823, and a communication module 824. The bearing control module 821, the compressor control module 822, and/or the driver control module 823 ("control modules") may be configured to provide conventional automated operational processing and control ("control algorithms") of their respective systems. Control algorithms are generally known in the art for controlling magnetic bearing, as well as centrifugal gas compressors and driver motors. Similarly, the communication module 824 may be configured to provide conventional communications between the control modules, and the bearing I/O terminal 840, the compressor I/O module 851, and the driver I/O module 861 ("I/O terminals"). In addition, the control modules may be configured to allow user control to and/or provide user feedback from the I/O terminals.

According to one embodiment, the control modules may be configured to communicate with each other. In particular, feedback and/or control commands may be shared amongst the control modules. For example, feedback directed toward the compressor control module 822 (e.g., valve position, inlet/outlet pressure, gas flow rate, temperature, heat exchanger status, etc.) may be shared with the bearing control module 821. Also for example, feedback directed toward the driver control module 823 (e.g., power, power bus voltage, power bus current, temperature, torque, rotational speed, etc.) may be shared with the bearing control module 821. Similarly, feedback directed toward the control modules may be shared with the compressor control module 822 and the driver control module 823.

According to one embodiment, the control modules may be further configured to use data from another module in its own control algorithms. In particular, the shared feedback and/or control commands from a first control module may be used to modify commands of a second control module. For example, the bearing control module 821 may be configured to use pressure sensor feedback directed toward compressor control module 822, or a determination from the compressor control module 822 indicating aerodynamic loading of the rotor 750, to offset or otherwise adjust a control command to the compressor thrust bearing 733.

The various illustrative logical blocks, units, steps and modules described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, or microcontroller. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm and the processes of a block or module described in connection with the embodiments disclosed herein can be embodied directly in hardware, in a software module (or unit) executed by a processor, or in a combination of the two. A software module can reside in the memory.

Various embodiments may also be implemented primarily in hardware using, for example, components such as application specific integrated circuits (ASICs), or field programmable gate arrays (FPGAs). Implementation of a hardware state machine capable of performing the functions described herein will also be apparent to those skilled in the relevant art. Various embodiments may also be implemented using a combination of both hardware and software.

INDUSTRIAL APPLICABILITY

The present disclosure generally applies to a control system in an industrial gas compressor. The described embodiments are not limited, however, to use in conjunction with a particular type of gas compressor (e.g., centrifugal, axial, etc.). Gas compressors such as centrifugal gas compressors are used to move process gas from one location to another. Centrifugal gas compressors are often used in the oil and gas industries to move natural gas in a processing plant or in a pipeline. Centrifugal gas compressors are driven by gas turbine engines, electric motors, or any other power source.

In some instances, embodiments of the presently disclosed control system are applicable to the use, operation, maintenance, repair, and improvement of centrifugal gas compressors, and may be used in order to improve performance and efficiency, decrease maintenance and repair, and/or lower costs. In addition, embodiments of the presently disclosed control system may be applicable at any stage of the centrifugal gas compressor's life, from design to prototyping and first manufacture, and onward to end of life. Accordingly, control system may be used in conjunction with a retrofit or enhancement to existing centrifugal gas compressors, as a preventative measure, or even in response to an event.

There is a desire to achieve greater efficiencies and reduce emissions in large industrial machines such as centrifugal gas compressors. Installing magnetic bearings in a centrifugal gas compressor may accomplish both desires. Centrifugal gas compressors may achieve greater efficiencies with magnetic bearings by eliminating any contact between the bearings and rotary element. Contact between the bearings and the rotary element generally causes frictional losses to occur. Magnetic bearings may use electromagnetic forces to levitate and support the rotary element without physically contacting the rotary, element eliminating the frictional losses.

Using magnetic bearings may reduce or eliminate production of undesirable emissions. These emissions may be produced by leaking or burning a lubricant such as oil. Eliminating the contact and frictional losses between the rotary element and bearings by supporting the rotary element with magnetic bearings may eliminate or reduce the need for lubricants in centrifugal gas compressors. With this elimination or reduction of lubricants or oil, the emissions in centrifugal gas compressors may be reduced or eliminated. Eliminating lubricants may also eliminate the need for the valves, pumps, filters, and coolers associated with lubrication systems.

Control of magnetic bearings in an industrial compressor requires high speed communications between feedback sensors and the controller. In particular, excessive input-to-output delays may lead to phase lag, which may lead to reduced damping. PC control may provide for previously unseen benefits. However, due to input-to-output delays a local DSP controller may be considered adequate.

Figure 4:
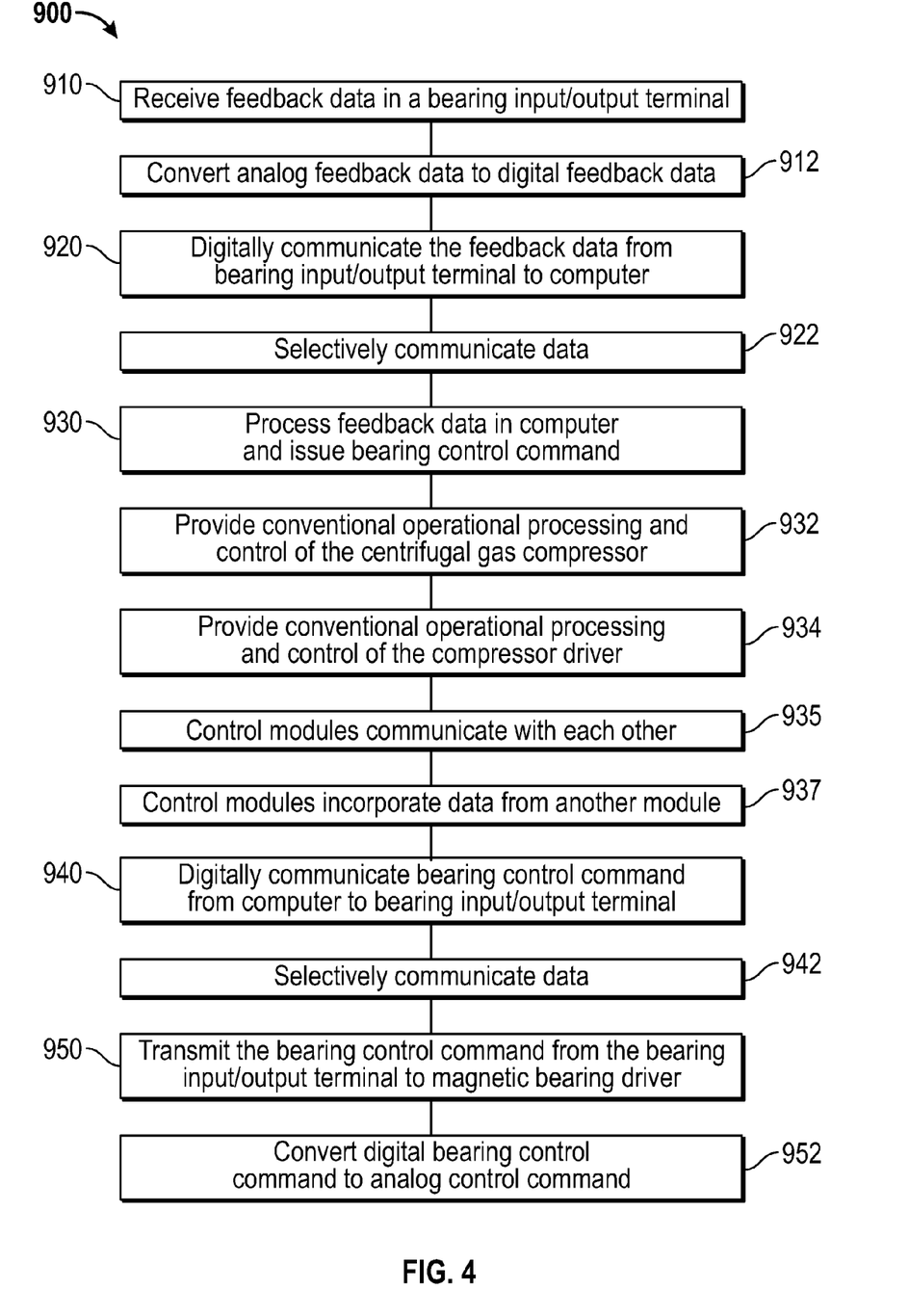
FIG. 4 is a flow chart of an exemplary method for controlling magnetic bearings in the centrifugal gas compressor of FIG. 1.

FIG. 4 is a flow chart of an exemplary method for controlling the centrifugal gas compressor of FIG. 1. The centrifugal gas compressor 700, the compressor driver 600, and particularly the compressor bearing system 730 can be controlled by a computer 810 with one or more of the following steps of a method 900, with reference to FIG. 1-3. The steps of method 900 may be performed in the order presented or out of the order presented. In addition, the steps of method 900 may be performed in parts. For example, one step may be performed in part, followed by one or more subsequent steps, and then completed.

In step 910, the bearing I/O terminal 840 receives feedback data. In particular, the I/O device 842 may receive feedback data multiple sources over multiple inputs. The feedback data may in be any form of signal (e.g., analog, digital, optical, etc.). Also, the feedback data may be from at least one sensor 639, 739 of the magnetic bearing system or other source.

For example, the bearing I/O terminal 840 may receive feedback data from the compressor bearing system 730 and/or the driver bearing system 630. Also for example, sensor input corresponding to the compressor shaft 720 or other rotating members (e.g., position, speed, vibration, angle, etc.) may be received. Also for example, ancillary input corresponding to environmental conditions (e.g., temperature, available power, etc.), compressor performance (e.g., compressor supply, compressor demand, compressor output, etc.), bearing performance (e.g., current, voltage, applied force, etc.), and other ancillary input may be received.

In step 912, the bearing I/O terminal 840 may convert analog feedback data to digital feedback data. In particular, the I/O device 842 may perform A/D conversion, signal sampling, electronic filtering and/or other signal conditioning. In addition, the I/O device 842 may include one or more digital inputs and communicate digitally inputted feedback data along with converted digital feed back data.

In step 920, the bearing I/O terminal 840 digitally communicates the feedback data to the computer 810. In particular, the communication device 843 may transmit digital feedback signals from the I/O device 842 to the computer 810 via the communication link 830. For example, the communication device 843 may communicate feedback data across an Ethernet based communication network. Also for example, the communication device 843 may communicate the feedback data to the computer 810 in accordance with a standardized fieldbus communication protocol, such as EtherCAT.

In step 922, the bearing I/O terminal 840 may selectively communicate data, communicating different classes of data separately. In particular, the communication device 843 may communicate different classes of data on separate paths. For example, the communication device 843 may communicate an EtherCAT telegram with either a first set of Datagrams based on a first class of signal or with a second set of Datagrams based on a second class of signal. Step 922 may further include creating and/or identifying one or more classes of data as discussed above. According to one embodiment, digitally communicating the feedback data from the bearing input/output terminal to a computer may include selectively communicating the feedback data.

In step 930, the computer 810 processes the feedback data and issues a bearing control command. In particular, the bearing control module 821 may provide conventional operational processing and control of the magnetic bearing system. For example, the processor 811 may issue commands directing the power amplifier 738 to increase or decrease magnetic attraction of the levitated member along one or more axes. In addition, the processor 811 may calculate bearing the control commands based on the feedback received, preset data libraries, and/or adaptive learning. Furthermore, the processor 811 may calculate bearing control commands based on a minimum 10 kHz sample rate (100 microseconds scan time), and/or on a 60 microsecond input-to-output delay.

In step 932, the computer 810 provides conventional operational processing and control of the centrifugal gas compressor 700, for example, in the compressor control module 822. Similarly, in step 934, the computer 810 provides conventional operational processing and control of the compressor driver 600, for example, in the driver control module 823.

In addition, the method 900 may include interactions between the bearing control module 821, the compressor control module 822, and the driver control module 823 ("control modules") within the computer 810. In particular, in step 935, the control modules may communicate with each other, for example, feedback and/or control commands may be shared amongst the control modules. Also, in step 937, the control modules may incorporate data from another module in its own operational processing and control functions, for example, shared feedback and/or control commands from a first control module may be used to modify commands of a second control module. Also, in step 939, the control modules may be dynamically adjusted, for example, the shared feedback and/or control commands from a first control module may be used to modify control algorithms of a second control module.

In addition, the method 900 may include interactions between the bearing control module 821, the compressor control module 822, and the driver control module 823 ("control modules") within the computer 810. In particular, in step 935, the control modules may communicate with each other, for example, feedback and/or control commands may be shared amongst the control modules. Also, in step 937, the control modules may incorporate data from another module in its own operational processing and control functions, for example, shared feedback and/or control commands from a first control module may be used to modify commands of a second control module. Also, in step 939, the control modules may be dynamically adjusted, for example, the shared feedback and/or control commands from a first control module may be used to modify control algorithms of a second control module.

In step 940, the computer 810 digitally communicates the bearing control command to the bearing I/O terminal 840. In particular, the communication device 813 may transmit digital control commands from the bearing control module 821 to bearing I/O terminal 840 via the communication link 830, similar to the digital communications of step 820.

In step 942, the computer 810 may selectively communicate data, communicating the different classes of data separately, similar to the selective communications of step 822 (e.g., at separate times). In addition, step 942 may include creating and/or identifying one or more classes of data as discussed above. Also, the communication device 813 may communicate as an EtherCAT master controller, whereas the communication device 843 of the bearing I/O terminal 840 may communicate as an EtherCAT master slave device. According to one embodiment, digitally communicating the bearing control command to the bearing I/O terminal may include selectively communicating the bearing control command.

In step 950, the bearing I/O terminal 840 transmits the bearing control command to the power amplifier 638, 738. In particular, the bearing I/O terminal 840 may then convert the bearing control command to voltage levels corresponding to a predetermined power level of the magnetic bearing assembly. For example, the communication device 843 may receive the bearing control command transmitted across the communication link 830, and communicate the bearing control command to I/O device 842. The I/O device 842 may then issue the bearing control command to the power amplifier 638, 738. In addition, at step 952, the I/O device 842 may convert any digital bearing control commands to analog control command as required, similar to step 912.

The control system described above includes several features that may improve communications. In particular, time savings may come from several features of the control system. For example, savings may come from providing a separate input frame and a separate output frame, instead of the standard frame containing both inputs and outputs. As a result, by decreasing the communication, remote computer control may be achieved.

The computer may improve on the current DSP controllers, as computers may have superior performance, flexibility, memory, applications/features, support, human-to-machine interface (HMI), etc. Moreover, computers may be user-modified by reprogramming software via a conventional user interface. In addition, once the magnetic bearings are controlled by the computer, synergistic benefits may be realized. In particular, the entire compressor system (centrifugal gas compressor, the compressor driver, and magnetic bearing) may reside on the same platform. Accordingly, the control system could be designed so the compressor, magnetic bearing, and engine or motor all share the same electric power supply and UPS.

The preceding detailed description is merely exemplary in nature and is not intended to limit the invention or the application and uses of the invention. The described embodiments are not limited to use in conjunction with a particular type or combination of driver and driven machine. For example, the driver may be an electric motor, a gas turbine engine, a reciprocating engine, or other rotating machine. Also for example the driven machine may be a gas compressor, a generator, or other rotatingly driven machine. Hence, although the present embodiments are, for convenience of explanation, depicted and described as being implemented in a centrifugal gas compressor driven by an electric motor, it will be appreciated that it can be implemented in various other types of drivers and driven machines, and in various other systems and environments. Furthermore, there is no intention to be bound by any theory presented in any preceding section. It is also understood that the illustrations may include exaggerated dimensions and graphical representation to better illustrate the referenced items shown, and are not consider limiting unless expressly stated as such.

What is claimed is:

1. A method for controlling a gas compressor, the gas compressor having a compressor driver, the method comprising:

communicating digital feedback data from a magnetic bearing system to a computer via a communication link, the computer including a bearing control module, a compressor control module, and a driver control module, the bearing control module being configured to process the feedback data and to issue a bearing control command, the compressor control module being configured to provide operational processing and control of the gas compressor, and the driver control module being configured to provide operational processing and control of the compressor driver;

processing the feedback data with the computer and issuing a bearing control command in response to the feedback data;

communicating the bearing control command from the computer to the magnetic bearing system via a communication link;

providing operational processing and control of the gas compressor with the computer;

providing operational processing and control of the compressor driver with the computer; and communicating feedback and commands from the compressor control module and the driver control module to the bearing control module.

2. The method of claim 1, wherein the communicating feedback and commands from the compressor control module and the driver control module to the bearing control module includes sharing at least one of a valve position, an inlet pressure, an outlet pressure, a gas flow rate, and a temperature from the compressor control module with the bearing control module.

3. The method of claim 1, wherein the communicating feedback and commands from the compressor control module and the driver control module to the bearing control module includes sharing at least one of a power, a power bus voltage, a power bus current, a temperature, a torque, and a rotational speed from the driver control module with the bearing control module.

4. The method of claim 1, further comprising dynamically adjusting the bearing control module in response to the communicated feedback and commands from the compressor control module and the driver control module.

5. The method of claim 4, wherein the dynamically adjusting the bearing control module includes modifying control algorithms of the bearing control module during operation of the gas compressor and based on the feedback and commands communicated from the compressor control module and the driver control module.

6. The method of claim 1, further comprising incorporating a first feedback and a first control command from the compressor control module or the driver control module into the bearing control module to modify a second feedback and a second control command of the bearing control module.

7. The method of claim 6, wherein the first feedback and a first control command includes pressure sensor feedback directed toward the compressor control module and a determination from the compressor control module indicating aerodynamic loading of a rotor of the gas compressor, and wherein the bearing control command is a modified or offset control command to a compressor thrust bearing.

8. The method of claim 6, wherein the first feedback and a first control command includes a rotational speed feedback directed toward the driver control module and a determination from the driver control module indicating a speed command for a driver shaft.

9. The method of claim 1, further comprising:

receiving feedback data in a bearing input/output terminal; and transmitting the bearing control command from the bearing input/output terminal to a magnetic bearing driver;

wherein the digitally communicating feedback data from the magnetic bearing system to the computer via the communication link includes digitally communicating the feedback data from the bearing input/output terminal to the computer via the communication link; and wherein the digitally communicating the bearing control command from the computer to the magnetic bearing system via the communication link includes digitally communicating the bearing control command from the computer to the bearing input/output terminal via the communication link.

10. The method of claim 9, wherein the bearing input/output terminal includes an analog-to-digital converter, and wherein the receiving feedback data includes receiving analog feedback data, the method further comprising converting the analog feedback data to digital feedback data via the analog-to-digital converter.

11. The method of claim 9, wherein the digitally communicating the feedback data from the bearing input/output terminal to the computer includes selectively communicating the feedback data in a first EtherCAT telegram, and wherein the digitally communicating the bearing control command from the computer to the bearing input/output terminal includes selectively communicating the bearing control command in a second EtherCAT telegram.

12. The method of claim 9, wherein the receiving feedback data in the bearing input/output terminal includes receiving feedback data from a compressor bearing system and a driver bearing system.

13. A control system for a centrifugal gas compressor, the centrifugal gas compressor including a compressor driver, a flow metering device, and a magnetic bearing system, the control system comprising:

a bearing input/output terminal including an input/output device, the input/output device configured to receive signals from at least one sensor of the magnetic bearing system, and to transmit control commands to at least one magnetic bearing driver of the magnetic bearing system; and a computer including a bearing control module configured to issue control commands for the at least one magnetic bearing driver in response to the signals from the at least one sensor of the magnetic bearing system, and to communicate feedback and commands with the compressor control module and the driver control module, a compressor control module configured to provide operational processing and control of the gas compressor, a driver control module configured to provide operational processing and control of the compressor driver, and a communication module configured to communicate with the bearing input/output terminal, the compressor driver, and the flow metering device.

14. The control system of claim 13, wherein the bearing input/output terminal further includes a communication device, the communication device being configured to communicate the signals from the at least one sensor of the magnetic bearing system to the computer and to receive the control commands from the computer, the communication device being further configured as an EtherCAT slave controller.

15. The control system of claim 14, wherein the communication device is configured to selectively communicate an EtherCAT telegram with either a first set of Datagrams based on a first class of signal or a second set of Datagrams based on a second class of signal.

16. The control system of claim 13, further comprising a communication link between the computer and the bearing input/output terminal,
  wherein the communication link is wired and extends at least 3 meters between the bearing input/output terminal and the computer.

17. The control system of claim 13, wherein the bearing control module is further configured to issue control commands for the at least one magnetic bearing driver in response to the feedback and commands from the compressor control module and the driver control module.

18. The control system of claim 13, wherein computer is configured to modify the bearing control module during engine operation and based on the feedback and commands communicated with the compressor control module and the driver control module.

* * * * *